(12) United States Patent
Allansson et al.

(10) Patent No.: US 6,680,037 B1
(45) Date of Patent: Jan. 20, 2004

(54) DEVICE AND METHOD FOR REMOVING SOOTY PARTICULATE FROM EXHAUST GASES FROM COMBUSTION PROCESSES

(75) Inventors: Ronny Allansson, Kungsbacka (SE); Anders Klas Andreasson, Frolunda (SE); Guy Richard Chandler, Cambridge (GB); James Patrick Warren, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 10/030,348

(22) PCT Filed: Jun. 15, 2000

(86) PCT No.: PCT/GB00/02342
§ 371 (c)(1),
(2), (4) Date: Jun. 19, 2002

(87) PCT Pub. No.: WO01/04466
PCT Pub. Date: Jan. 18, 2001

(30) Foreign Application Priority Data

Jul. 8, 1999 (GB) ............................................. 9915939

(51) Int. Cl.⁷ .......................... B01D 53/34; B01D 53/94
(52) U.S. Cl. ............................. 423/215.5; 423/213.2; 423/213.7; 423/239.1; 422/168; 422/169; 422/170; 422/173; 422/177; 422/178; 422/180
(58) Field of Search ..................... 423/213.2, 213.7, 423/215.5, 239.1; 422/168, 169, 170, 173, 177, 178, 180

(56) References Cited

U.S. PATENT DOCUMENTS

| 4,902,487 A | 2/1990 | Cooper et al. ........... 423/215.5 |
| 6,294,141 B1 * | 9/2001 | Twigg et al. ............. 423/213.7 |
| 2003/0095904 A1 * | 5/2003 | Cheng ........................ 423/235 |

FOREIGN PATENT DOCUMENTS

| EP | 0 319 299 A2 | 6/1989 |
| EP | 0 341 832 A2 | 11/1989 |
| EP | 0 758 713 A1 | 2/1997 |
| EP | 1 065 352 A2 | 1/2001 |
| JP | 8-144740 | 6/1996 |
| JP | 11-182796 | 6/1999 |
| JP | 12-53569 | 2/2000 |
| WO | WO 97/48890 | 12/1997 |
| WO | WO 99/44725 | 9/1999 |

OTHER PUBLICATIONS

International Search Report dated Sep. 19, 2000 for PCT/GB00/02342.
British Search Report dated Aug. 17, 1999 for GB 9915939.4.

* cited by examiner

Primary Examiner—Steven Bos
Assistant Examiner—Timothy C. Vanoy
(74) Attorney, Agent, or Firm—RatnerPrestia

(57) ABSTRACT

A canister (1) contains a catalyst for generating $NO_2$ and a filter (8) for trapping PM, e.g. from diesel engines. The filter is thermally isolated from the canister, and preferably is surrounded by an annular monolith comprising the NO oxidation catalyst or a SCR catalyst. The invention facilitates the combustion of PM even at low exhaust gas temperatures, in a compact device.

16 Claims, 6 Drawing Sheets

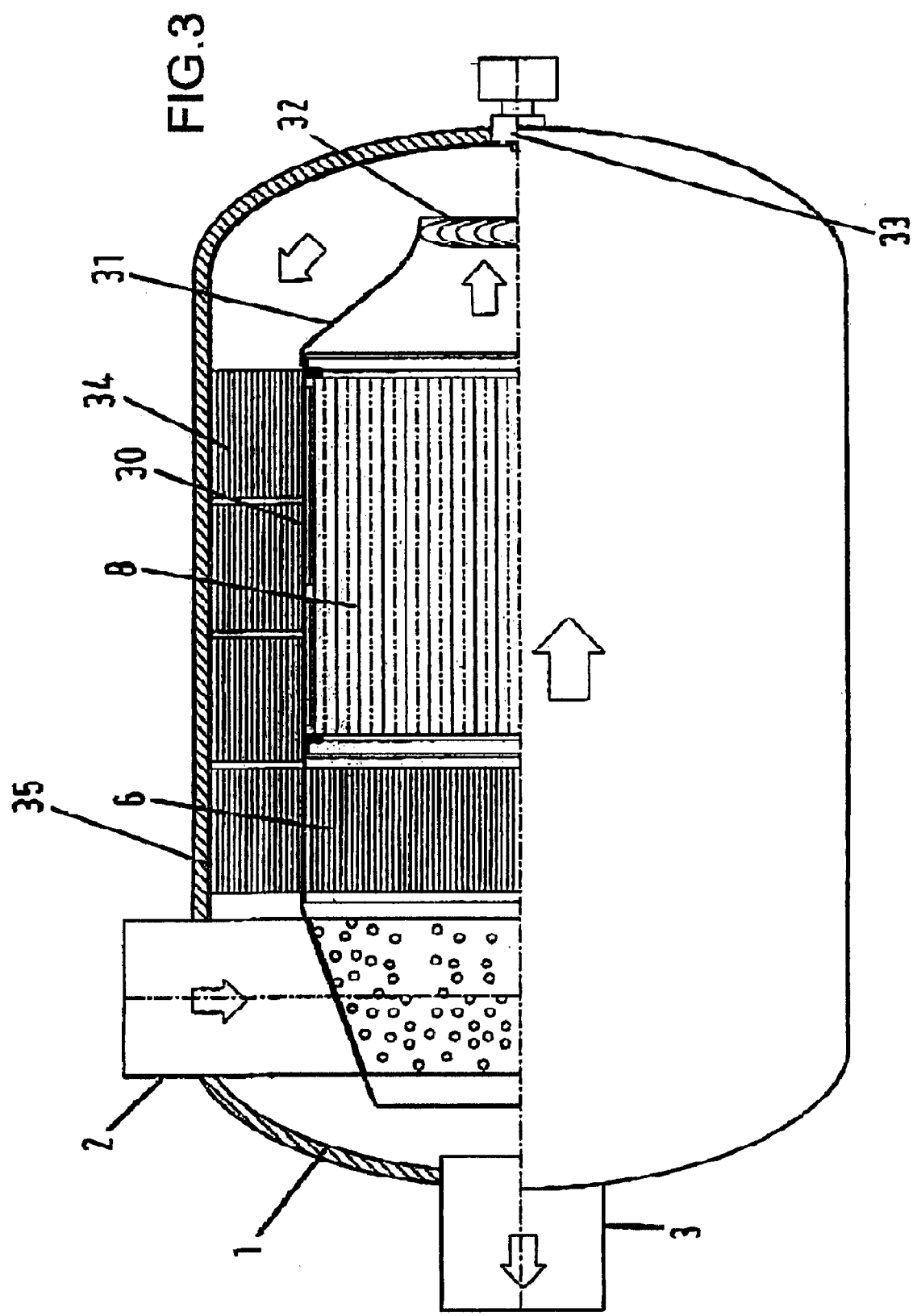

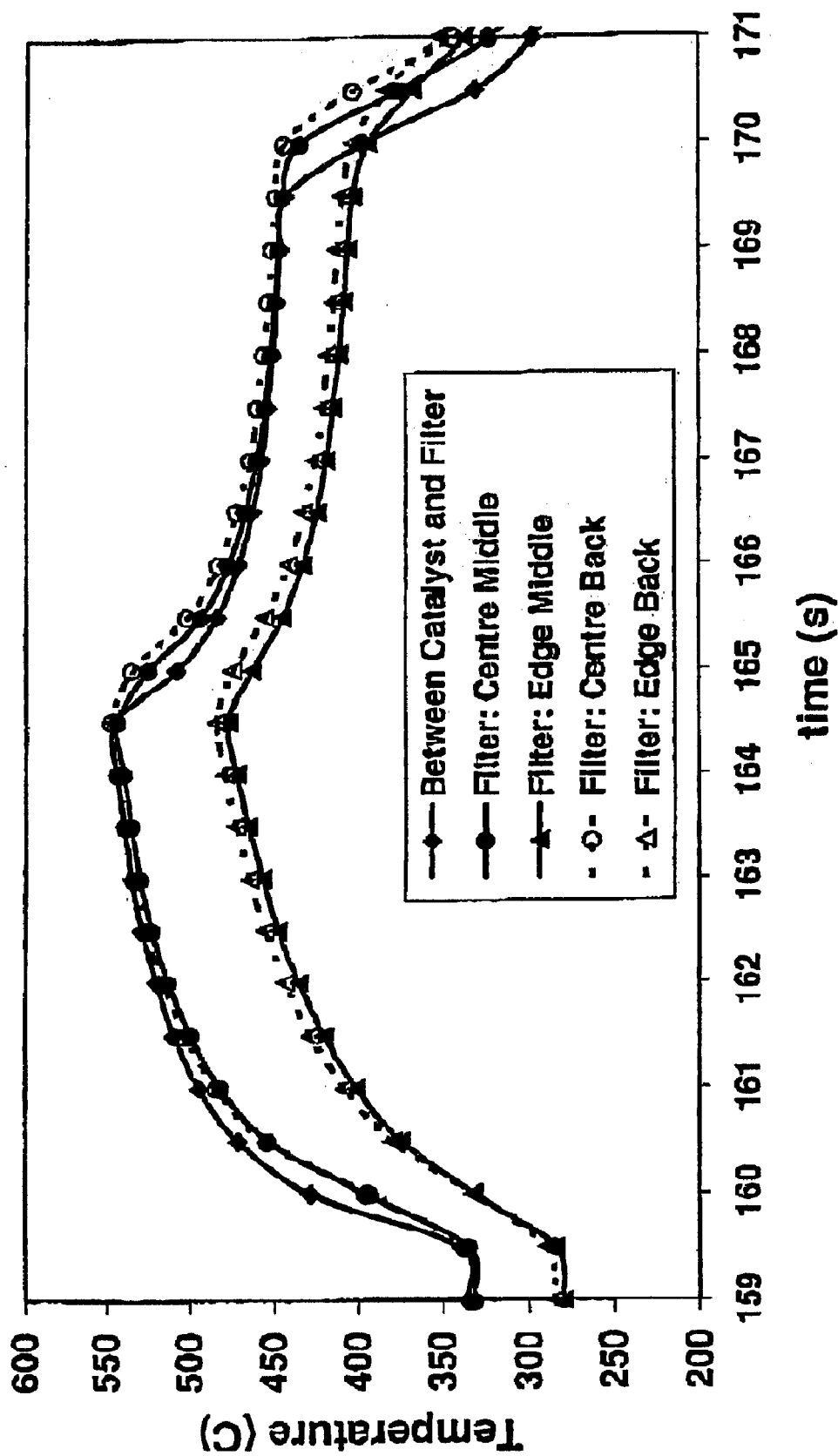

Figure 1:
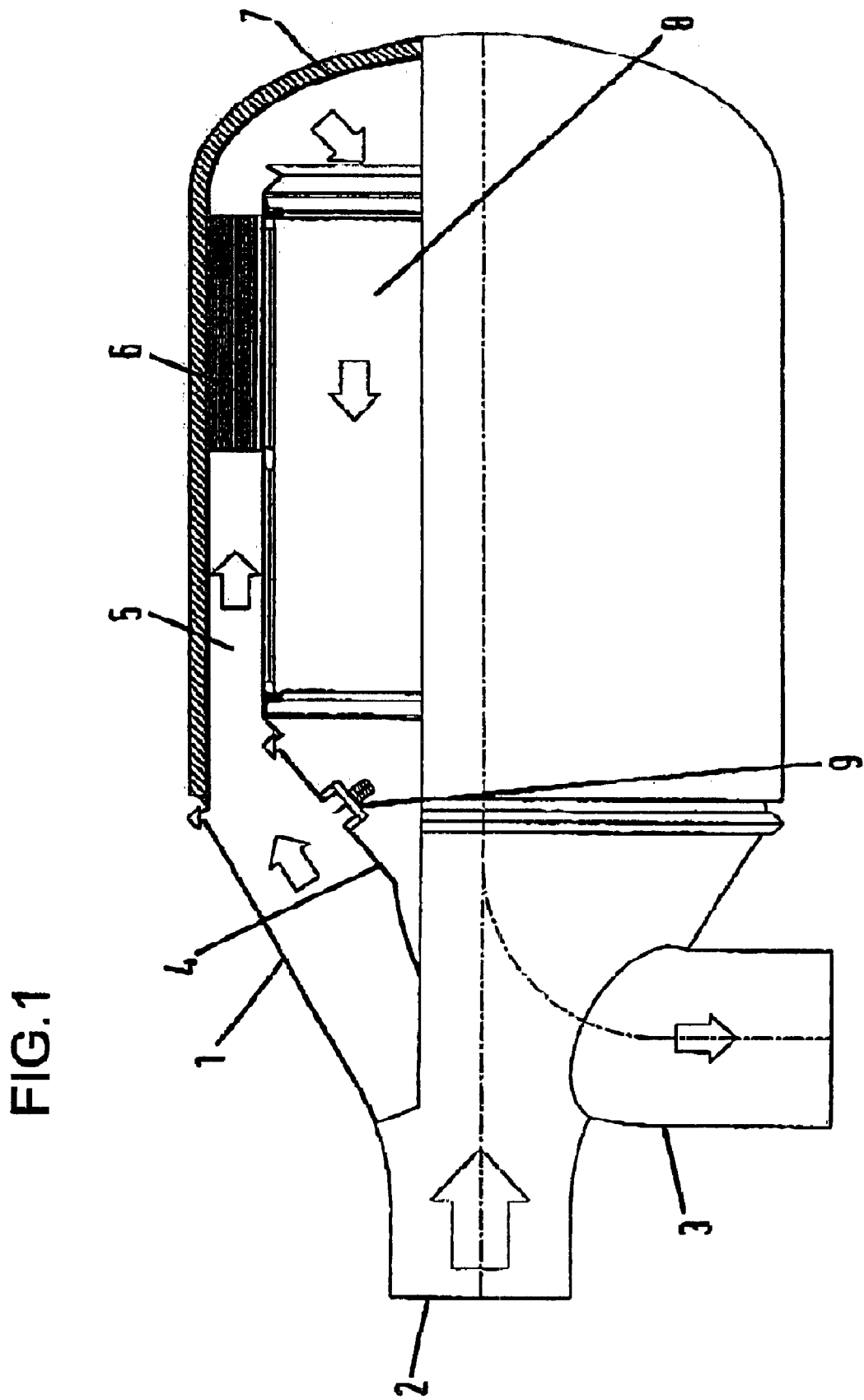

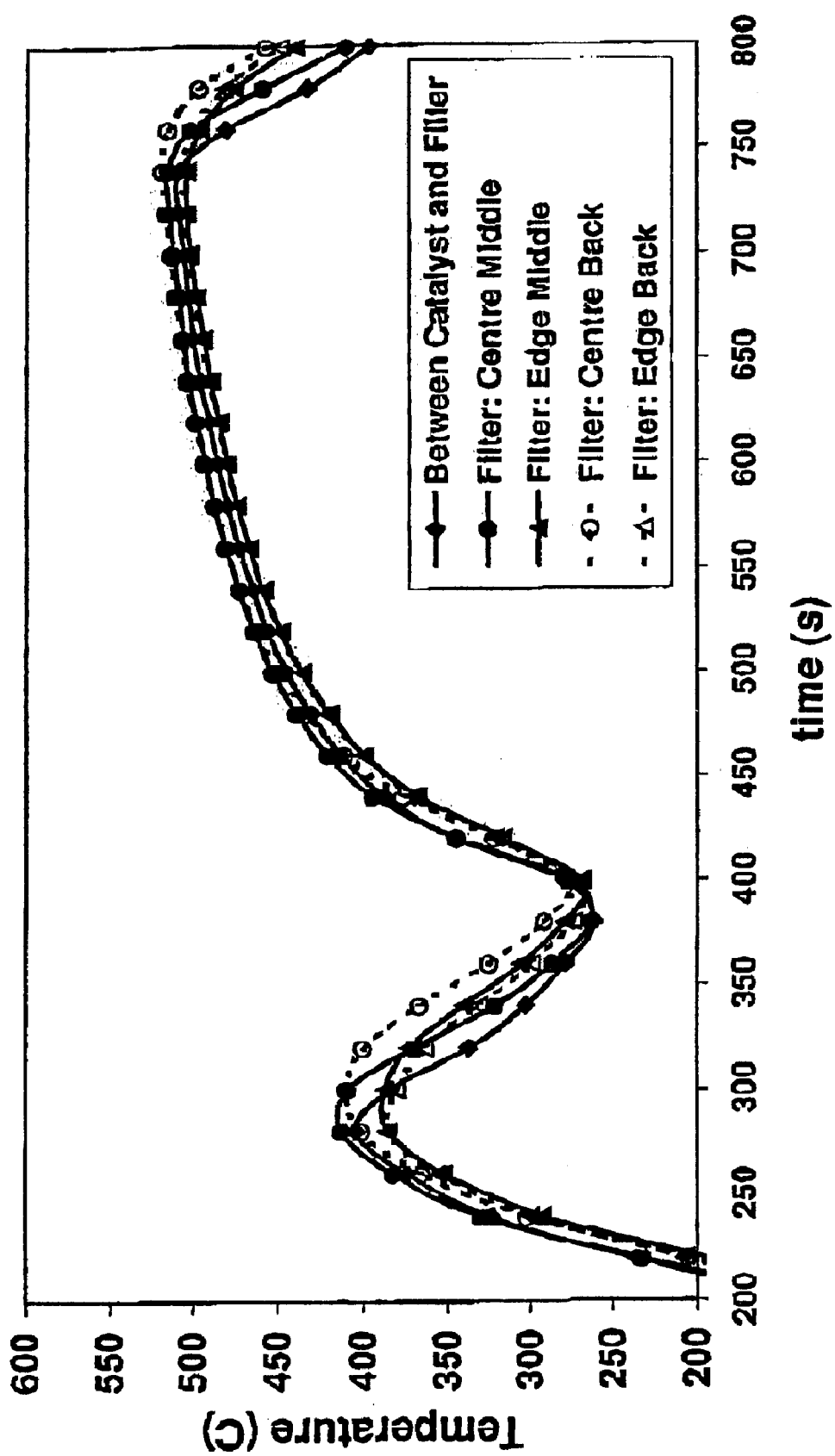
FIG.5 Compact CRT: Annular Catalyst

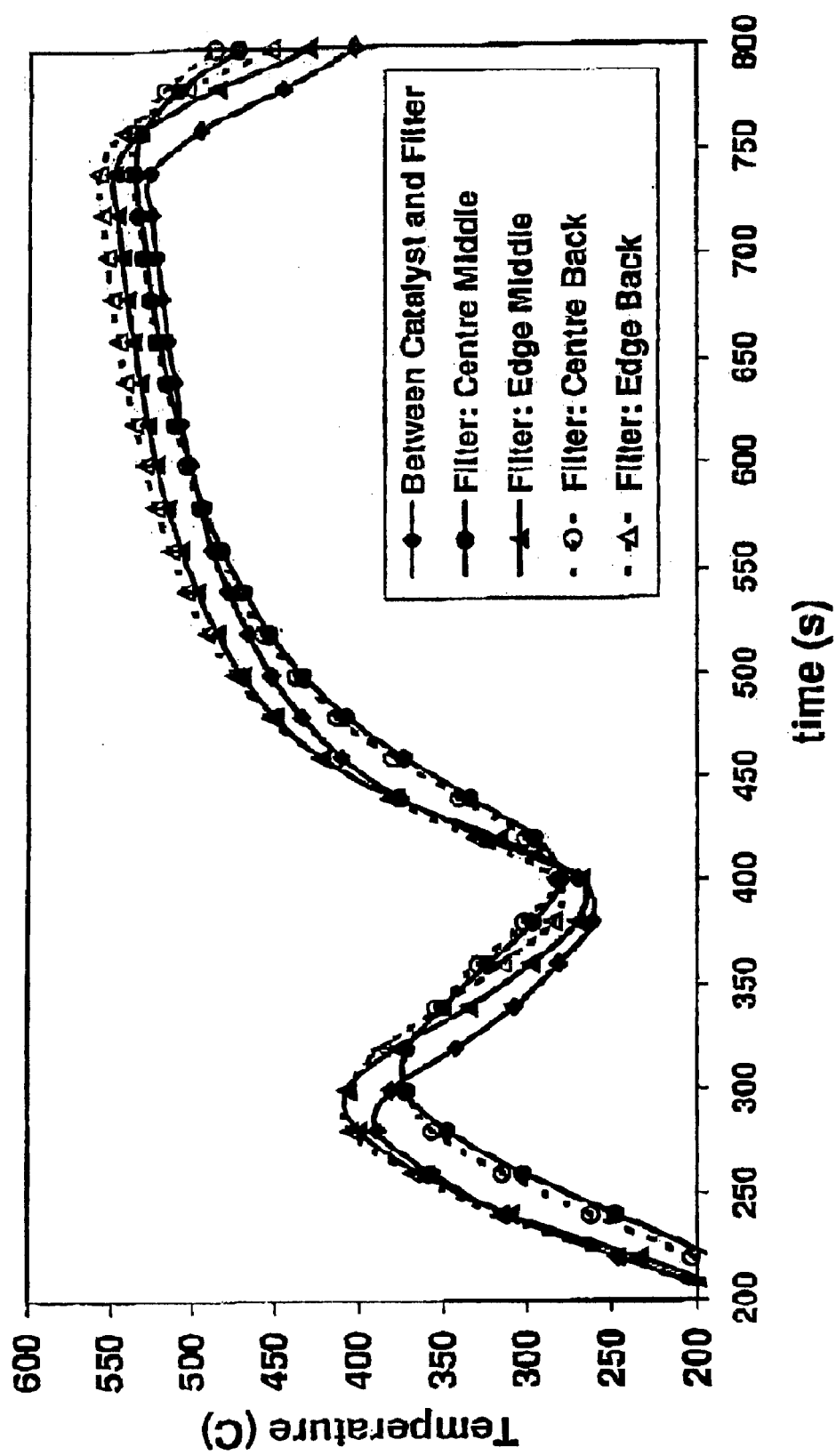

DEVICE AND METHOD FOR REMOVING SOOTY PARTICULATE FROM EXHAUST GASES FROM COMBUSTION PROCESSES

This application is the U.S. national phase application of PCT International Application No. PCT/GB00/02342.

This invention concerns improvements in pollution control, and more especially it concerns an improved device and method for removing sooty particulate "PM" from exhaust gases from combustion processes, particularly from diesel engines.

The leading technology for removing PM from heavy duty diesel engine exhausts is believed to be Johnson Matthey's "Continuous Regeneration Technology" or "CRT™". This is described broadly in U.S. Pat. No. 4,902, 487 and utilises the fact that PM may be combusted at significantly lower temperatures in reactions with $NO_2$ than the conventional reaction with oxygen. The commercial CRT™ devices pass the exhaust gas though a catalyst which is effective to convert NO into $NO_2$, traps PM on a downstream filter and allows the $NO_2$ to combust the PM. The CRT™ device is being fitted to many thousands of heavy duty trucks and buses in advance of the regulations being introduced in Europe and U.S.A. A characteristic of light duty diesel engines, however, is their exhaust gas temperature is appreciably lower than that of heavy duty diesel engines. A number of engine design modifications introduced for both fuel efficiency and pollution control reasons, and the used of small turbocharged diesel engines, have reduced the exhausted gas temperatures (and NO or $NO_2$) levels to the point where even the CRT™ does not produce sufficient $NO_2$ and/or the reaction proceeds efficiently only under certain operating conditions when the exhaust gas temperature rise. Competing technology such as the catalysed PM trap is, we believe, even less able to cope with such engine exhaust gases and such exhaust gas temperatures, and these tend to clog up quickly.

We now provide an improved CRT™ design believed to be specially suitable for light duty diesel engine exhausts, and all other diesel engine exhausts where the temperature is rather low for effective performance of the various oxidation/combustion reaction. According, a device for the continuous or part-continuous removal of PM from exhaust gases from the combustion processes, comprise a canister, said canister containing a catalytic element capable or converting NO in the exhaust gases to $NO_2$ and a trap for said PM, characterised in that the trap is mounted such that it si thermally isolated from the canister and preferably is in good thermal contact with the catalyst. A preferred layout is to use an annular catalyst surrounding the filter. Suitable this can be the NO oxidation catalyst or another catalyst.

The invention further provides an improved method for the continuous or part-continuous combustion of PM in combustion exhaust gases by trapping said PM and combusting the trapped PM using $NO_2$, characterized in that the temperature of the filter in maintained at an effective temperature by isolating the filter from the external environment.

The presently preferred method of constructing the device according to the invention is to use an annular catalyst, surrounding the PM trap. Without wishing to be bound by any theory, it is believed that such an arrangement is advantageous because the PM trap is isolated from the canister, so that the trap is not cooled by ambient air, and generally, the filter temperature is thus maintained at a higher temperature, enabling PM combustion to take place event at lower exhaust gas temperature.

In one embodiment of the invention the annular catalyst is the catalyst for the oxidation of NO to $NO_2$. The exhaust gases pass over the annular catalyst and then the gas stream must be reversed in order to cause it to flow countercurrent through the trap. This arrangement brings several advantages:

1. The section of the trap which is most used for both trapping and combustion is facing towards the hot exhaust gas stream, thus helping to maintain the filter temperature;
2. The catalyst itself will be cooled by contact with the canister, which has the result that $NO_2$ production is lowered during lower exhaust gas temperatures at which the $NO_2$ PM burning reaction is slow, and reducing the opportunity for $NO_2$ to slip through the device unreacted; and
3. To some extent the exotherm from the NO oxidation reaction heats the trap, thus increasing the combustion reaction.

In another embodiment of the invention, the device incorporates a Selective Catalytic Reduction ("SCR") zone. SCR is used to remove $NO_2$ from the exhaust gas before the gas is released to the atmosphere. A reductant such as ammonia, hydrazinc, urea or lower alkylamines is injected upstream of catalyst that promotes the selective reduction of $NO_2$. Desirably, the SCR catalyst is annular and is placed around the filter. In such an arrangement, the oxidation catalyst may be in an axial position with regard to the filter. The combination of SCR with an oxidation catalyst and filter is covered in general terms in our pending patent application No. PCT/GB99/00292, but is described therein in an essentially linear disposition. This embodiment of the present invention is believed to offer particular benefits, in that both the filter and the oxidation catalyst are surrounded by a hot zone or warm exhaust flow at all times, thus ensuring the most advantageous utilisation of exhaust gas heat for the required reactions. The exothermic SCR reaction provides additional heat to the filter. Also, the entire unit can be constructed in a very compact form, suitable for on-board vehicle use.

The preferred device according to the invention can be readily constructed, using conventional mechanical engineering and construction techniques. If desired, substantially all, or a desired portion, of the canister may be insulated to maintain reaction temperature as high as possible.

The device according to the invention may be combined with an Exhaust Gas Recirculation system in which the gas for recirculation is taken downstream of the device, or possibly downstream of the catalyst.

The device of the invention may be filled with a by-pass or pressure-relief means, to permit exhaust gases to flow even if unusual operating conditions caused complete blocking of the trap.

The catalyst used in the invention is preferably a high-loading Pt containing catalyst, e.g. containing 10 to 150 g Pt per cu ft (353–5297 g Pt per $m^3$) of catalyst volume. Other catalytic components or promoters may be present. The catalyst is preferably deposited on an annular honeycomb monolith which may be metal or ceramic and is of generally known type. The trap may also be of generally known type, but is preferable a ceramic wall flow filter. It may be mounted within the device by a quick-release clamp, to permit trap to be reversed and/or cleaned to remove accumulated ash.

In a further embodiment of the invention, a single ceramic monolith may be used both as the oxidation catalyst support and as the trap. In such a case, exhaust gases are fed to the outermost cells of the monolith, which are catalysed, then the gases are forced to flow through the central portion which has alternating cells at each end blocked, so that the central portion acts as a wall flow filter.

It will be understood that the terminology "trap" and "filter" includes any apparatus causing the PM to be retained or have a sufficiently lengthy residence time that reaction with $NO_2$ takes place.

Figure 2:
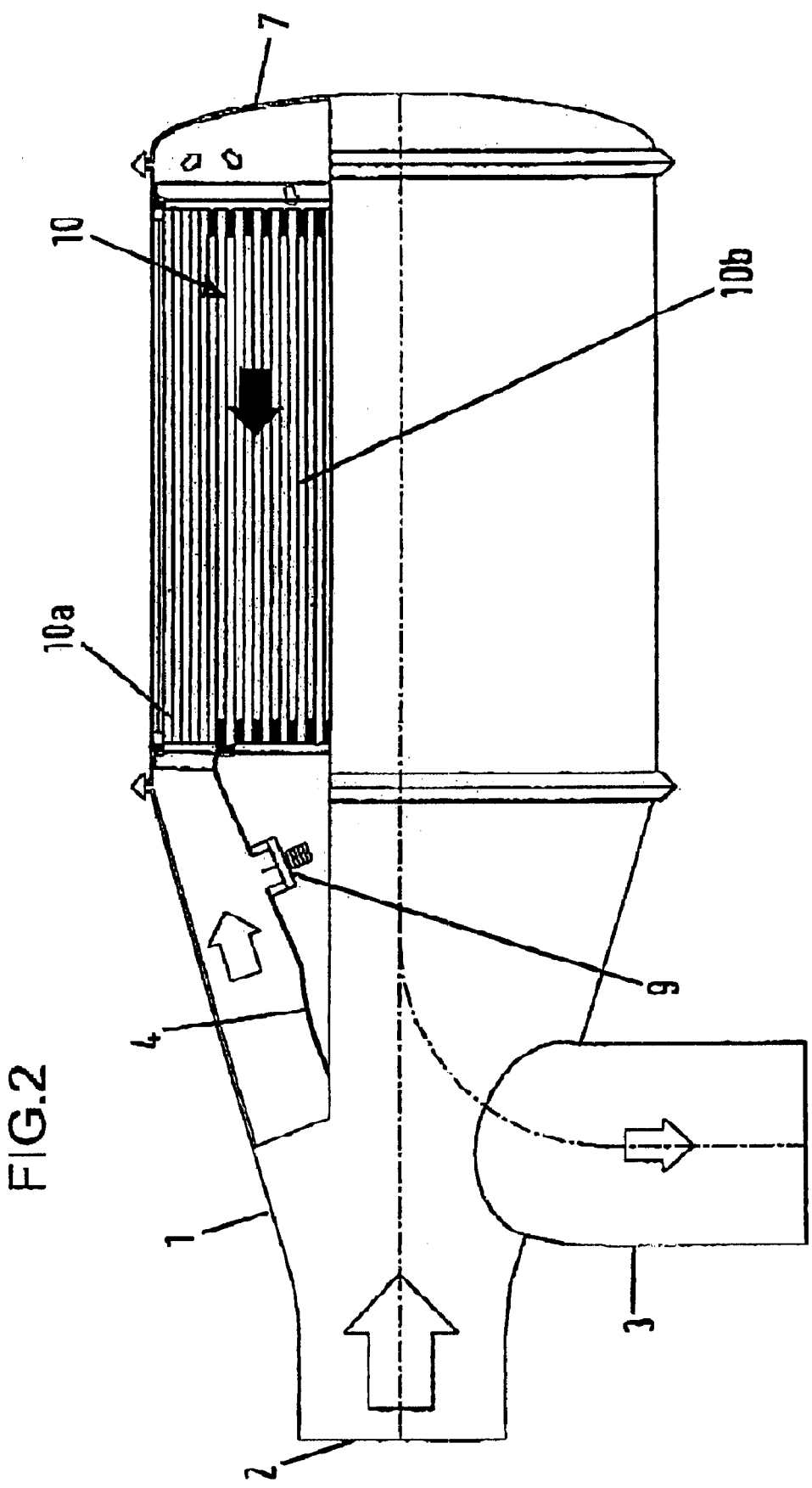

The canister used in the invention may be manufactured from stainless steel, and may be insulated in part or in whole. Preferably, the device is used with an engine fuelled with low-sulphur diesel fuel, preferably less than 50 ppm S, more preferably less than 10 ppm S.

the invention will now be described by way of example only, with reference to the accompanying drawing, and figures, in which:

FIG. 1 is a schematic drawing, partly in section, of a first embodiment of the invention, FIG. 2 is a schematic drawing, partly in section, of a second embodiment of the invention, FIG. 3 is a schematic drawing, partly in section, of a third embodiment of the invention, incorporating SCR, FIG. 4 is a graph showing the temperature distribution in a CRT™ reference system FIG. 5 is a graph showing the temperature distribution in the first embodiment of the invention as represented schematically by FIG. 1, and FIG. 6 is a graph showing the temperature distribution in the second embodiment of the invention as represented schematically by FIG. 2.

In the drawings and the following description, identical reference numerals are used for identical parts.

Referring to FIG. 1, a stainless steel canister, 1, is provided with an inlet, 2, for diesel engine exhaust gases, and an outlet, 3, for gases having passed through the device of the invention. The inlet and outlet positions are not significant, e.g. the inlet may be radial and t he outlet axial, or both inlet and outlet may be radial, providing that the gas flow through the deivice is in the correct order. The incoming exhaust gases are diverted by a metal cone, 4, to pass through an annular space, 5, and an annular catalyst, 6, supported on a flow-through honeycomb support. The NO content of the exhaust gases is converted at least in part to $NO_2$ in the catalyst; other reactions may also take place on the catalyst or, if desired, on a pre-catalyst. The gases, enriched with $NO_2$, are turned by the rounded end, 7, of the canister, to flow through a central PM trap, 8, before entering the cone 4 and being carried out through outlet 3. In FIG. 1, the canister is partly insulated to retain reaction heat. A simple poppet-type by-pass valve, 9, permits a relief of excessive pressure if there is blockage of the filter.

Referring now to FIG. 2, a single ceramic substrate, 10, has a peripheral annular portion, 10a, with flow-through cells and a central portion, 10b, with alternately plugged cells. The annular portion 10a is suitably coated with washcoat and with platinum catalyst, and is effective to convert NO in the gases to $NO_2$. The central portion of the monolith has alternate cells plugged, so that it acts as wall flow filter.

Referring now to FIG. 3, the entire outer canister 1 is insulated and contains a platinum oxidation catalyst, 6, supported on a ceramic flow-through monolith, and a ceramic wall-flow filter element or trap, 8, held in axial relationship within a central canister part, 30. The part 30 is fitted with a conical end, 31, fitted with mixer vanes, 32. An injector for SCR reductant fluid, 33, is fitted to inject a suitable fluid reductant into the rapidly rotating gas flow, before the mixture is reversed in direction and flows through an annular SCR catalyst, 34. A final section of catalyst, 35, is provided to clean up the exhaust flow, eg to remove ammonia.

This embodiment offers good mixing of gases with reductant whilst maintaining the high filter temperatures characteristic of the present invention. Particularly good conversion of both PM and NOx pollutants can be obtained in a very compact unit. The other features mentioned above, such as easy removal/cleaning/reversal of the trap, and the incorporation of a by-pass valve, may also be included in this embodiment.

FIGS. 4–6 represent data collected to demonstrate the thermal management benefits of the first and second embodiments of the invention as represented in FIG. 1 and FIG. 2. A reference CRT™ system (in which the filter is not thermally isolated from the canister) and the two embodiments of the invention were subjected to transient conditions, during which the temperature into the filter system changed substantially. The response of the temperature at different positions in the filter system was monitored using thermocouples. In each case the thermocouple were located in the following positions:

(a) between the catalyst and the filter,
(b) along the central axis of the filter, half-way along its length ('Centre Middle'),
(c) at the outside edge of the filter, half-way along its length ('Edge Middle'),
(d) along the central axis of the filter, at the filter outlet ('Centre Back'),
(e) at the outside edge of the filter, at the filter outlet ('Edge Back').

FIGS. 4–6 show how the temperature at these points varied as the inlet temperature to the system was changed.

FIG. 4 shows that the temperature along the central axis of the filter closely follows the temperature between the catalyst and the filter (ie the temperature at the filter inlet). However, the temperature is significantly lower at the edge of the filter (ie where there is contact with the can). By contrast, FIGS. 5 and 6 show that in the embodiments of the present invention the temperature distribution is far more uniform across the filter. There is no significant cooling at the edge of the filter, showing that the filter temperature is maintained at a higher temperature, thus enabling the soot combustion reaction.

What is claimed is:

1. A device for the continuous removal of particulate matter (PM) from exhaust gases from combustion processes, comprising a canister, said canister containing: (i) a catalytic element selected from the group consisting of at least one of an NO oxidation catalyst for converting NO in the exhaust gases to $NO_2$ and another catalyst and (ii) a trap for said PM, the arrangement being such that the trap is thermally isolated from the canister, wherein the trap is in thermal contact with the catalytic element, whereby it may gain heat from the catalytic element in operation.

2. A device according to claim 1, wherein an annular catalyst surrounds the trap.

3. A device according to claim 2 wherein the catalytic element is the NO oxidation catalyst and the annular catalyst is the NO oxidation catalyst.

4. A device according to claim 3, further comprising a SCR catalyst and means for injecting a SCR reductant upstream of the SCR catalyst.

5. A device according to claim 3, wherein the catalyst and trap form part of a unitary monolith.

6. A device according to claim 2, further comprising a SCR catalyst and means for injecting a SCR reductant upstream of the SCR catalyst.

7. A device according to claim 2, wherein the catalyst and trap form part of a unitary monolith.

8. A device according to claim 1, further comprising a SCR catalyst and means for injecting a SCR reductant upstream of the SCR catalyst.

9. A device according to claim 8 wherein the SCR catalyst is an annular catalyst surrounding the trap.

10. A device according to claim 9, wherein the catalyst and trap form part of a unitary monolith.

11. A device according to claim 8, wherein the catalyst and trap form part of a unitary monolith.

12. A device according to claim 1, wherein the catalyst and trap form part of a unitary monolith.

13. A device according to claim 1, wherein the catalytic element is the NO oxidation catalyst.

14. A device according to claim 1, wherein the catalytic element is the other catalyst.

15. A method for the continuous or part-continuous combustion of particulate matter (PM) in combustion exhaust gases by trapping said PM on a trap and combusting said trapped PM using $NO_2$, wherein the temperature of the trap is maintained at an effective temperature by isolating the trap from the external environment, wherein the heat from a catalytic process is used to provide heat to the trap to maintain its temperature at an effective level for the combustion of PM.

16. A method according to claim 15, wherein the cleaned gases leaving the trap are subjected to a SCR process.

* * * * *

UNITED STATES PATENT AND TRADEMARK OFFICE
CERTIFICATE OF CORRECTION

PATENT NO. : 6,680,037 B1
DATED : January 20, 2004
INVENTOR(S) : Allansson et al.

It is certified that error appears in the above-identified patent and that said Letters Patent is hereby corrected as shown below:

<u>Title page,</u>
Item [86], delete:

"PCT No.: PCT/GB00/02342
§ 371 (c)(1),
(2), (4) Date: June 19, 2002" and insert therefor -- PCT No.: PCT/GB00/02342
§ 371 (c)(1),
(2), (4) Date: June 17, 2002 --

Signed and Sealed this

Twentieth Day of April, 2004

JON W. DUDAS
*Acting Director of the United States Patent and Trademark Office*